US012528170B2

(12) United States Patent
Schneider

(10) Patent No.: US 12,528,170 B2
(45) Date of Patent: Jan. 20, 2026

(54) IMPACT TOOL ANVIL WITH IMPROVED DURABILITY

(71) Applicant: MILWAUKEE ELECTRIC TOOL CORPORATION, Brookfield, WI (US)

(72) Inventor: Jacob P. Schneider, Cedarburg, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

(21) Appl. No.: 18/646,072

(22) Filed: Apr. 25, 2024

(65) Prior Publication Data

US 2024/0359305 A1 Oct. 31, 2024

Related U.S. Application Data

(60) Provisional application No. 63/461,796, filed on Apr. 25, 2023.

(51) Int. Cl.
*B25D 17/06* (2006.01)

(52) U.S. Cl.
CPC ...... *B25D 17/06* (2013.01); *B25D 2217/0015* (2013.01)

(58) Field of Classification Search
CPC ........................ B25D 17/06; B25D 2217/0015
See application file for complete search history.

(56) References Cited

U.S. PATENT DOCUMENTS

| | | | |
|---|---|---|---|
| 3,053,360 | A | 9/1962 | Madsen |
| 5,871,059 | A | 2/1999 | Shibata et al. |
| 6,484,814 | B2 | 11/2002 | Bongers-Ambrosius |
| 6,491,111 | B1 | 12/2002 | Livingston et al. |
| 6,938,526 | B2 | 9/2005 | Milbourne et al. |
| 7,036,406 | B2 | 5/2006 | Milbourne et al. |
| 7,377,338 | B2 | 5/2008 | Bassinger |
| 7,950,471 | B2 | 5/2011 | Loeffler et al. |
| 7,980,321 | B2 | 7/2011 | Happ |
| 8,827,003 | B2 | 9/2014 | Nagasaka et al. |
| 8,939,229 | B2 | 1/2015 | Hartmann et al. |
| 9,044,847 | B2 | 6/2015 | Kohlschmied et al. |
| 9,272,400 | B2 | 3/2016 | Johnson |
| 9,321,159 | B2 | 4/2016 | May |
| 9,539,715 | B2 | 1/2017 | McClung |
| 9,993,916 | B2 | 6/2018 | Chen et al. |
| 10,272,550 | B2 | 4/2019 | Dey, IV et al. |

(Continued)

FOREIGN PATENT DOCUMENTS

| | | |
|---|---|---|
| CN | 103381590 A | 11/2013 |
| CN | 203409733 U | 1/2014 |

(Continued)

*Primary Examiner* — Michelle Lopez
(74) *Attorney, Agent, or Firm* — Michael Best & Friedrich LLP

(57) ABSTRACT

An anvil is for use with an impact tool. The anvil includes an impact receiving portion having a lug configured to be impacted to rotate the anvil about an axis, a drive portion opposite the impact receiving portion, and a shank extending between the impact receiving portion and the drive portion. The drive portion is configured for coupling to a tool bit. The shank includes a necked portion having a reduced diameter. The necked portion is located adjacent the drive portion and between the impact receiving portion and the drive portion.

19 Claims, 11 Drawing Sheets

(56) References Cited

U.S. PATENT DOCUMENTS

| | | | |
|---|---|---|---|
| 10,583,545 | B2 | 3/2020 | Dey, IV et al. |
| 2006/0157261 | A1 | 7/2006 | Chen |
| 2006/0237206 | A1 | 10/2006 | Schamberger et al. |
| 2008/0029283 | A1 | 2/2008 | Hammerstingl |
| 2008/0296034 | A1 | 12/2008 | Braun |
| 2011/0058356 | A1 | 3/2011 | Friedman et al. |
| 2011/0233878 | A1 | 9/2011 | Wan et al. |
| 2012/0234566 | A1 | 9/2012 | Mashiko et al. |
| 2013/0021783 | A1 | 1/2013 | Vanko et al. |
| 2014/0262394 | A1 | 9/2014 | Scott et al. |
| 2015/0000946 | A1 | 1/2015 | Amend et al. |
| 2015/0014005 | A1 | 1/2015 | Puzio et al. |
| 2015/0022125 | A1 | 1/2015 | Takano et al. |
| 2017/0173768 | A1 | 6/2017 | Dey, IV et al. |
| 2019/0030696 | A1 | 1/2019 | Seith et al. |
| 2019/0118353 | A1 | 4/2019 | Woetzl et al. |
| 2019/0171166 | A1 | 6/2019 | Zanesco et al. |
| 2019/0232471 | A1 | 8/2019 | Paoli et al. |
| 2020/0171632 | A1 | 6/2020 | Dey, IV et al. |
| 2020/0215668 | A1 | 7/2020 | Duncan et al. |
| 2021/0060741 | A1 * | 3/2021 | Kusumoto ............ B25B 21/026 |
| 2021/0379743 | A1 | 12/2021 | Schneider et al. |
| 2021/0394344 | A1 | 12/2021 | Mueckl et al. |
| 2022/0040829 | A1 | 2/2022 | Schneider et al. |

FOREIGN PATENT DOCUMENTS

| | | | |
|---|---|---|---|
| CN | 205237922 | U | 5/2016 |
| DE | 3024715 | A1 | 4/1982 |
| DE | 3039617 | A1 | 5/1982 |
| EP | 0218547 | A2 | 4/1987 |
| EP | 2140982 | A1 | 1/2010 |
| EP | 2447006 | A2 | 5/2012 |
| GB | 1424473 | A | 2/1976 |
| JP | H06160007 | A | 6/1994 |
| JP | 2004066413 | A | 3/2004 |
| JP | 2013215884 | A | 10/2013 |
| KR | 1020140106190 | A | 9/2014 |
| KR | 1020170035400 | A | 3/2017 |
| WO | 2009036526 | A1 | 3/2009 |
| WO | 2018100802 | A1 | 6/2018 |
| WO | 2021016437 | A1 | 1/2021 |

* cited by examiner

IMPACT TOOL ANVIL WITH IMPROVED DURABILITY

CROSS-REFERENCE TO RELATED APPLICATIONS

This application claims priority to U.S. Provisional Patent Application No. 63/461,796, filed Apr. 25, 2023, the entire content of which is incorporated herein by reference.

FIELD

The present disclosure relates to anvils for use with rotary impact tools.

SUMMARY

The present disclosure provides, in one aspect, an anvil for use with an impact tool. The anvil includes an impact receiving portion having a lug configured to be impacted to rotate the anvil about an axis, a drive portion opposite the impact receiving portion, and a shank extending between the impact receiving portion and the drive portion. The drive portion is configured for coupling to a tool bit. The shank includes a necked portion having a reduced diameter. The necked portion is located adjacent the drive portion and between the impact receiving portion and the drive portion.

The present disclosure provides, in another aspect, an anvil for use with an impact tool. The anvil includes an impact receiving portion having a lug configured to be impacted to rotate the anvil about an axis, a drive portion opposite the impact receiving portion, and a shank extending between the impact receiving portion and the drive portion. The drive portion includes a side having a first portion and a second portion angled relative to the first portion. The drive portion is configured for coupling to a tool bit.

The present disclosure provides, in another aspect, an anvil for use with an impact tool. The anvil includes an impact receiving portion having a lug configured to be impacted to rotate the anvil about an axis, a drive portion opposite the impact receiving portion, and a shank extending between the impact receiving portion and the drive portion. The drive portion includes a side having a depression. The drive portion is configured for coupling to a tool bit. The depression is configured to be spaced apart from the tool bit.

The present disclosure provides, in another aspect, an anvil for use with an impact tool. The anvil includes an impact receiving portion having a lug configured to be impacted to rotate the anvil about an axis, a drive portion opposite the impact receiving portion, a shank extending between the impact receiving portion and the drive portion, and a target extending outwardly from the shank between the impact receiving portion and the drive portion. The drive portion is configured for coupling to a tool bit. The shank includes a necked portion having a reduced diameter, the necked portion located between the lug and the target.

The present disclosure provides, in another aspect, an anvil for use with an impact tool. The anvil includes an impact receiving portion including first and second lugs, each of the first and second lugs having a first face configured to be impacted to rotate the anvil about an axis in a first direction, a second face configured to be impacted to rotate the anvil about the axis in a second direction opposite the first direction, and a peak located between the first face and the second face, the peak defining a radially outer-most point of each first and second lug relative to the axis. The anvil further includes a drive portion opposite the impact receiving portion. The drive portion is configured for coupling to a tool bit. A plane is defined through the peak of the first lug and the peak of the second lug such that the plane extends between the first impact face and the second impact face of each of the first and second lugs, and each of the first and second lugs is asymmetric about the plane.

The present disclosure provides, in another aspect, an anvil for use with an impact tool. The anvil includes an impact receiving portion having a lug configured to be impacted to rotate the anvil about an axis, a drive portion opposite the impact receiving portion, the drive portion configured for coupling to a tool bit, the drive portion including a bore extending into the drive portion along the axis, a shank extending between the impact receiving portion and the drive portion, and a plug having an annular flange, a shaft, and a step between the annular flange and the shaft, the shaft being receivable in the bore. The anvil also includes a first ring surrounding the step and a second ring surrounding the first ring. The first ring is made of a first material, the second ring is made of a second material with a greater hardness than the first material.

Other features and aspects of the invention will become apparent by consideration of the detailed description and accompanying drawings. Any feature(s) described herein in relation to one aspect or embodiment may be combined with any other feature(s) described herein in relation to any other aspect or embodiment as appropriate and applicable.

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
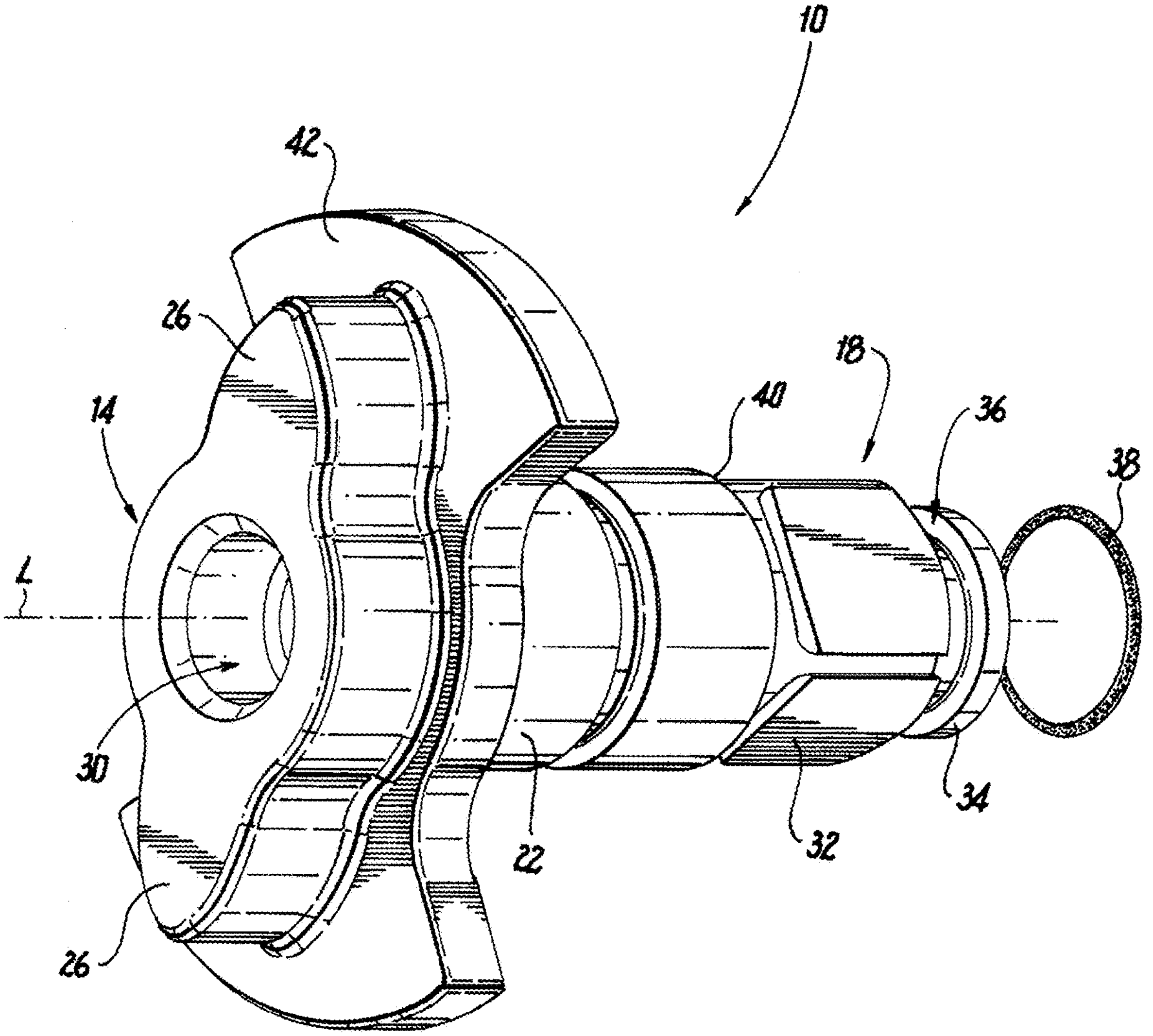
Fig. 1 (Prior Art)
FIG. 1 is a perspective view of a prior art anvil.
Figure 2:
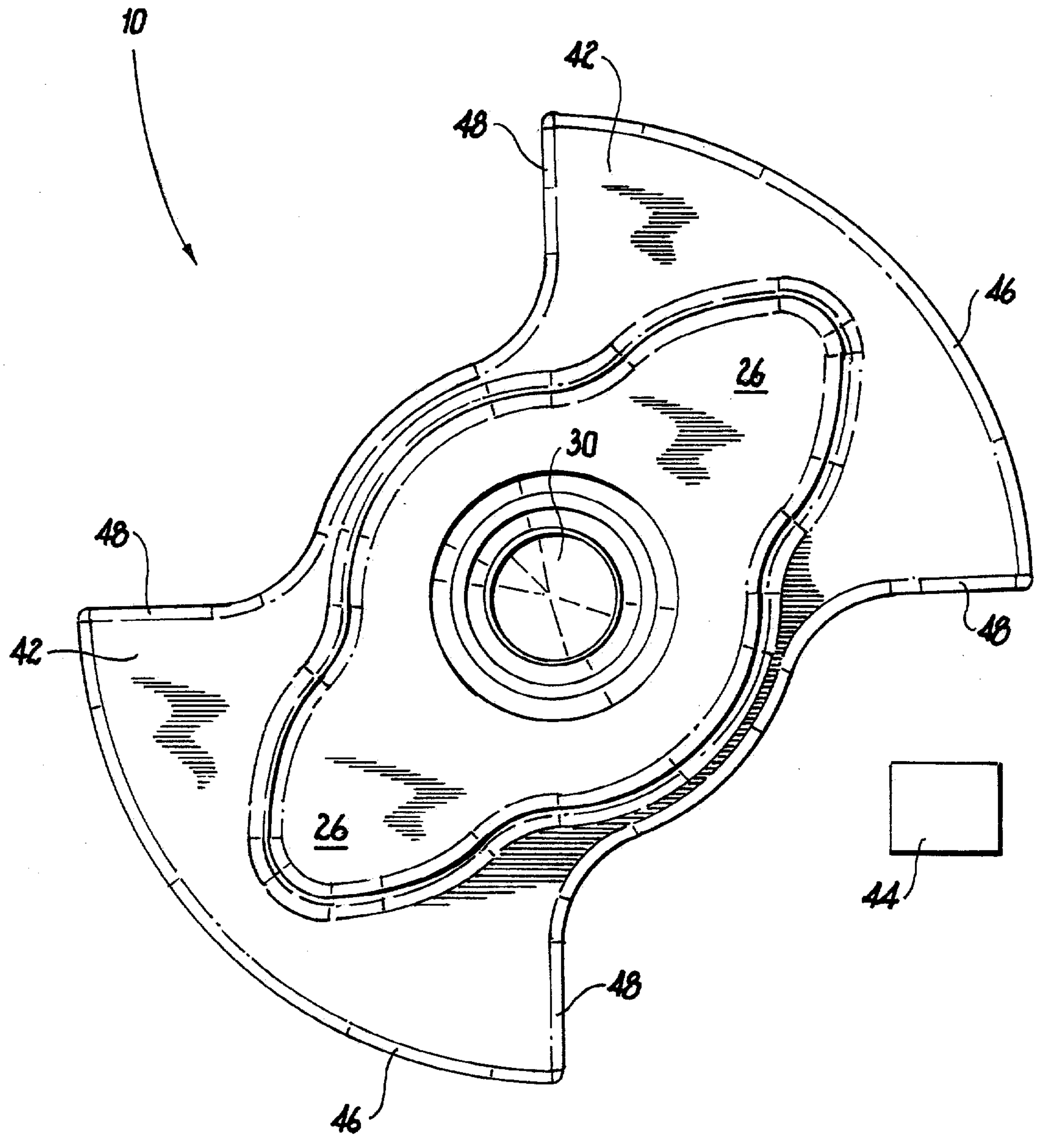
Fig. 2 (Prior Art)
FIG. 2 is a rear end view of the anvil of FIG. 1.

FIGS. 1 and 2 illustrate an anvil 10 that may be used in a rotary impact tool, such as an impact wrench. The anvil 10 includes an impact receiving portion 14, a drive portion 18 opposite the impact receiving portion 14, and a body or shank 22 extending between the impact receiving portion 14 and the drive portion 18. The impact receiving portion 14 includes a plurality of lugs 26 and a central bore 30. The drive portion 18 includes a drive 32, which in the illustrated embodiment is configured as a square drive, an annular flange 34, and a groove 36 between the drive 32 and the annular flange 34. The drive 32 transitions to the shank 22 at a shoulder 40.

The groove 36 is configured to receive a ring 38 (e.g., a rubber o-ring). The drive 32 is configured for coupling to a tool bit (e.g., a socket), and the ring 38 engages the interior of the tool bit to provide increased friction, thereby retaining the tool bit on the drive 32. The anvil 10 is assembled by coupling the ring 38 to the drive portion 18. The ring 38 is stretched such that the ring 38 may fit over the annular flange 34. Once over the annular flange 34, the tension in the ring 38 is released, and the ring 38 resiliently recovers into the groove 36.

The anvil 10 includes a target 42 adjacent the impact receiving portion 14. The illustrated target 42 is configured to be detected by a sensor 44 (FIG. 2). The target 42 includes curved regions 46 that are bounded by linear edges 48. The illustrated curved regions 46 are aligned with the respective anvil lugs 26. When the anvil 10 rotates, the linear edges 48 of the target 42 pass over the sensor 44, allowing the sensor 44 to detect and measure rotation of the anvil 10.

During operation, the anvil 10 receives rotary impacts (e.g., from a hammer of the impact tool), which cause the anvil 10 to rotate about a longitudinal axis L. As the anvil 10 rotates, the sensor 44 can detect each rotation of the anvil 10, or, in some embodiments, each fractional rotation of the anvil 10 (e.g., each half rotation of the anvil 10) by detecting the target 42. Because the edges 48 of the target 42 are linear, a clear signal is produced when the edges 48 pass over the sensor 44. Feedback from sensor 44 can be used to determine the impact frequency (e.g., impacts per minute) delivered by the anvil 10 to a fastener or workpiece, and/or the rotational speed of the anvil 10.

Because the anvil 10 is subjected to high magnitude and repetitive torsional loading (during each impact when applying torque to a workpiece), the anvil 10 may experience failure due to fatigue. Surfaces of the anvil 10, and especially the impact surfaces of the lugs 26, surfaces of the drive 32, and the shoulder 40, may also be susceptible to failure due to contact stresses.

The inventors have determined that the target 42 increases the torsional stiffness of the anvil 10 and that fatigue and contact stress failures are impacted by the torsional stiffness. For example, as the anvil 10 receives rotary impacts, the anvil 10 may flex slightly, which reduces peak stresses in the anvil 10. Because the target 42 adds stiffness in the anvil 10, the anvil 10 may be susceptible to fatigue and contact stress failures. Failure may also occur at the shoulder 40, if the tool bit wedges against the shoulder 40 during use. The contact between the tool bit and the shoulder 40 may add additional forces to the anvil 10, which may lead to failure. Finally, because the ring 38 must be flexible and soft enough to stretch and then recover, the hardness of the ring 38 is relatively low. As such, the ring 38 is susceptible to tearing and damage over time due to contact with the interior of the tool bit. Although the ring 38 is replaceable, damage to the ring 38 may cause downtime and inefficiency, particularly if a user is not carrying a spare.

Figure 3:
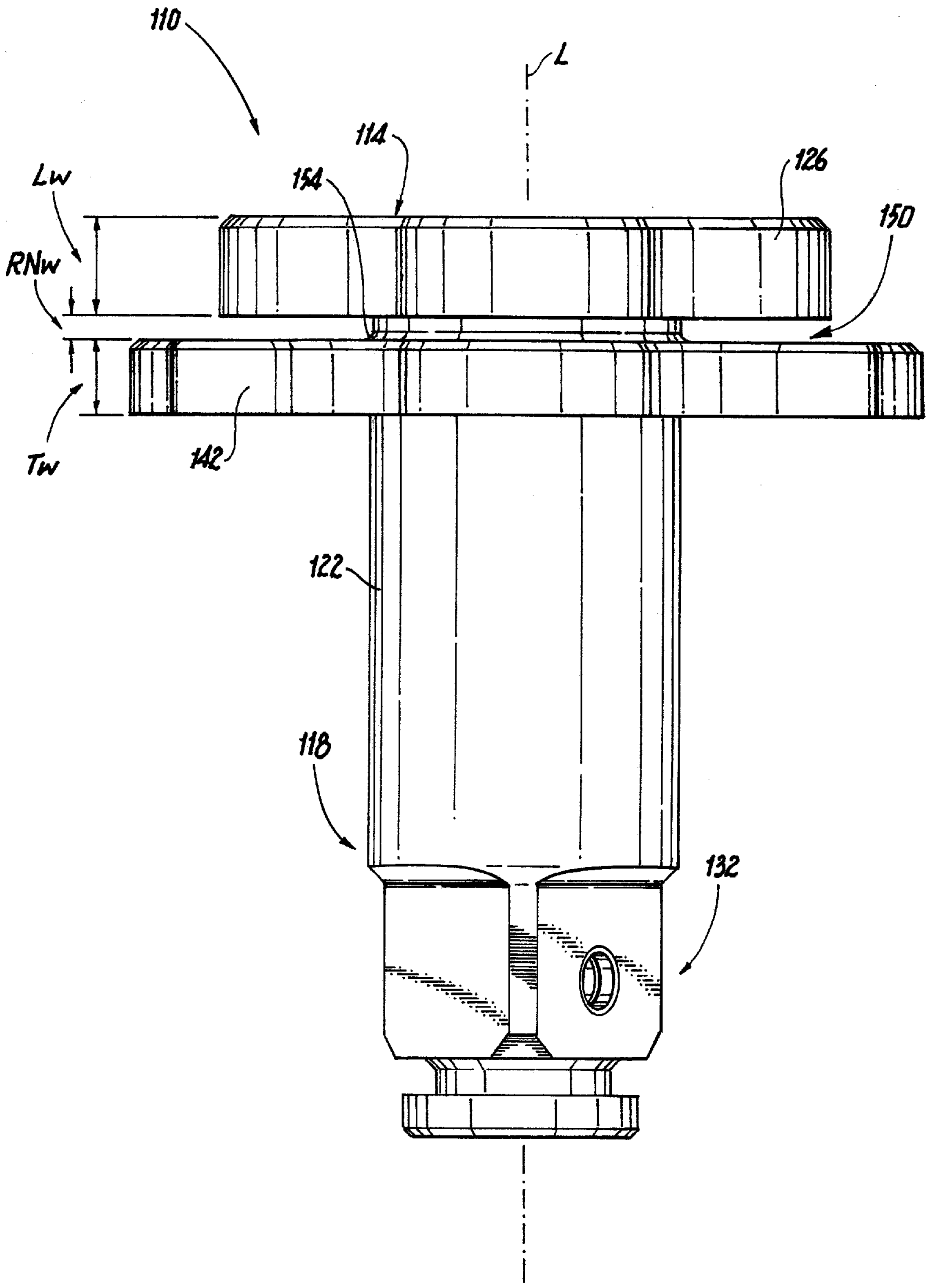
FIG. 3 is a top view of an anvil according to an embodiment of the disclosure.

FIG. 3 illustrates an exemplary embodiment of an anvil 110, which may have improved durability compared to the anvil 10 described above with reference to FIGS. 1-2. The anvil 110 includes an impact receiving portion 114, a drive portion 118 opposite the impact receiving portion 114, and a body or shank 122 extending between the impact receiving portion 114 and the drive portion 118. The impact receiving portion 114 includes a plurality of lugs 126 configured to be impacted (e.g., by a hammer of a rotary impact tool) to rotate the anvil 110 about an axis L. The drive portion 118 includes a drive 132, which in the illustrated embodiment is configured as a square-drive, configured for coupling to a tool bit (e.g., a socket).

The anvil 110 further includes a rear necked portion 150 between the impact receiving portion 114, and more specifically the lugs 126, and the target 142. The illustrated target 142 is integrally formed with the anvil 110 as a single piece. The illustrated anvil 110 includes a radius 154 between the target 142 and the rear necked portion 150. In some embodiments, there may also be radius between the rear necked portion 150 and the impact receiving portion 114. In other embodiments, there may be differently shaped corners (e.g., chamfers, fillets, etc.) between the target 142 and the rear necked portion 150, and between the rear necked portion 150 and the impact receiving portion 114.

With continued reference to FIG. 3, the impact receiving portion 114 defines a lug width Lw, the rear neck 150 defines a rear neck width RNw, and the target 142 defines a target width Tw. The illustrated lug width Lw is greater than both the neck width RNw and the target width Tw, with the target width Tw being greater than the neck width RNw. In some embodiments, the neck width RNw may be equal to or greater than the target width Tw and/or the lug width Lw.

In operation, the rear necked portion 150 permits the anvil 110 to flex a greater degree than the anvil 10, particularly between the impact receiving portion 114 and the target 142. This may reduce instances of fatigue failures and contact stress failures, thereby improving the durability and service life of the anvil 110.

Figure 4:
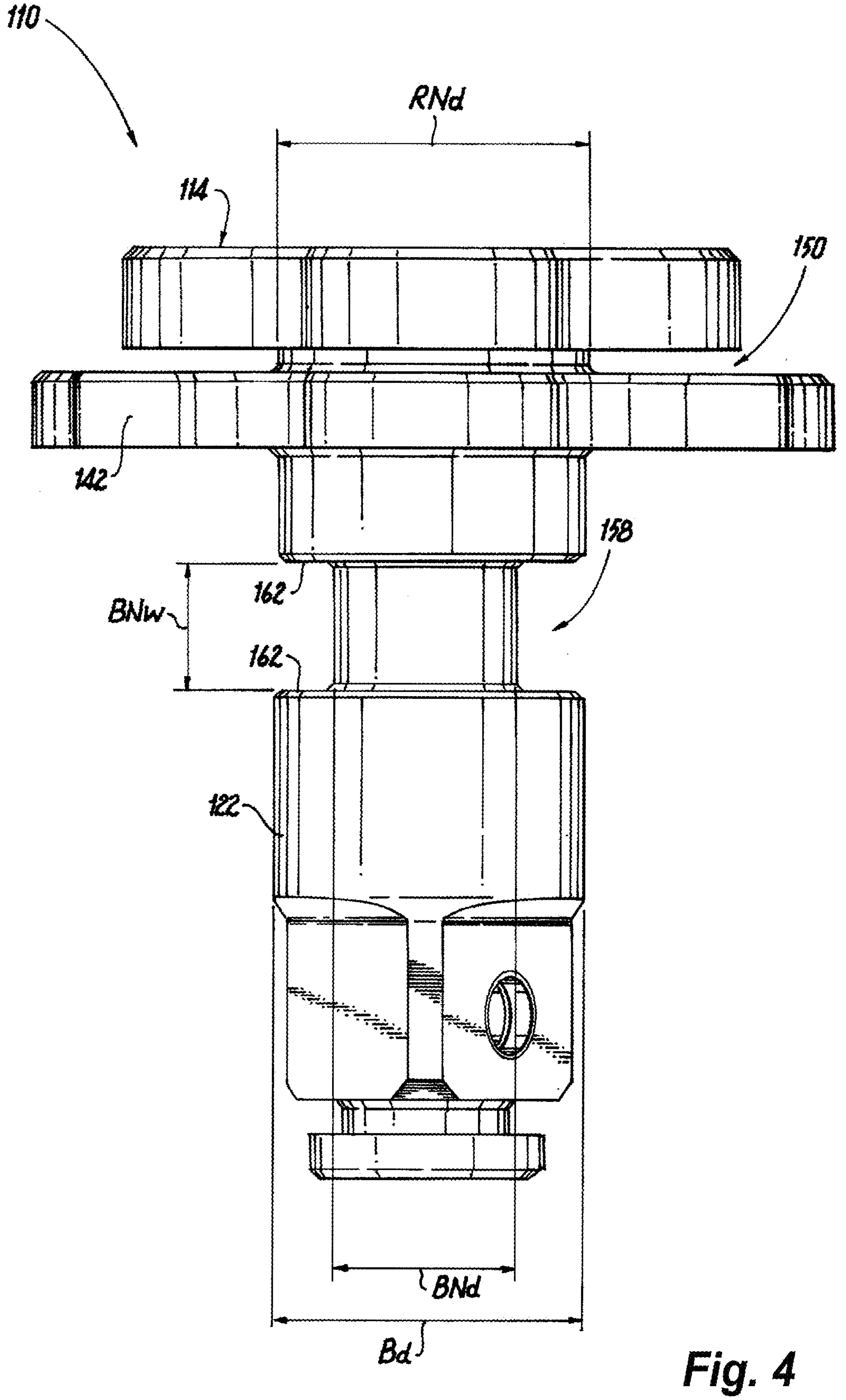
FIG. 4 is a top view of an anvil according to another embodiment of the disclosure.

FIG. 4 illustrates the anvil 110 according to another embodiment in which the anvil 110 has a second necked portion in the shank 122 of the anvil 110. The second necked portion 158 has a diameter BNd that is less than a shank diameter Bd and a rear necked portion diameter RNd. In some embodiments, the diameter BNd may be equal to or greater than the diameter RNd. Additionally, the second necked portion 158 includes a width BNw that is greater than the width RNw of the rear necked portion 150. In some embodiments, the width BNw may be equal to or less than the width RNw. The illustrated anvil 110 includes radii 162 between the second necked portion 158 and the rest of the shank 122, which may further reduce stresses.

The rear necked portion 150 and the shank necked portion 158 are shaped to reduce the torsional stiffness of the anvil 110, such that as the lugs 126 are impacted, the anvil 110 flexes to absorb and distribute some of the impact force and improve the durability and surface life of the anvil 110.

Figure 5:
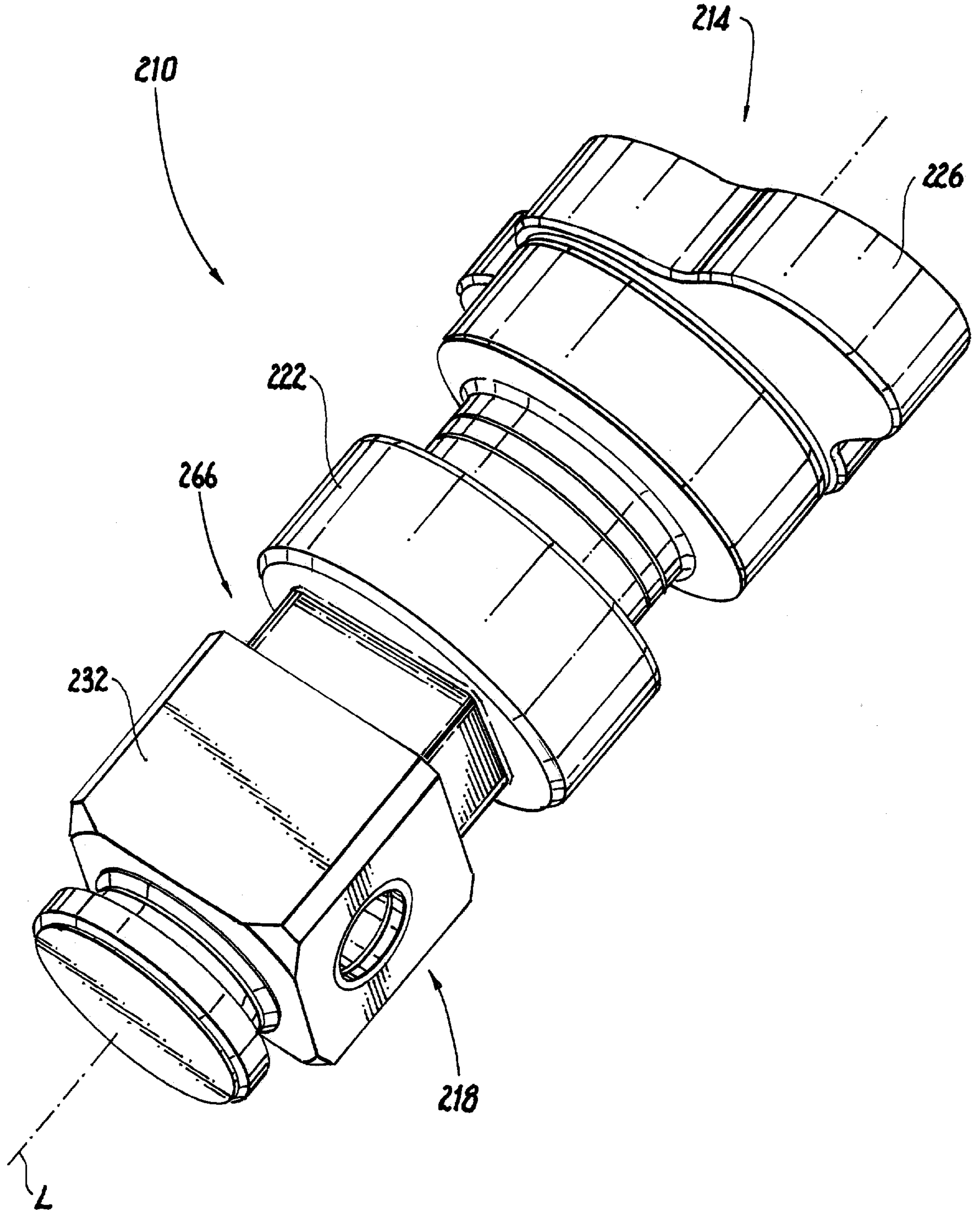
FIG. 5 is a perspective view of an anvil according to another embodiment of the disclosure.

FIG. 5 illustrates an anvil 210 according to another embodiment. Features of the anvil 210 may be incorporated into the anvil 110 and vice versa. The anvil 210 includes an impact receiving portion 214, a drive portion 218 opposite the impact receiving portion 214, and a body or shank 222 extending between the impact receiving portion 214 and the drive portion 118. The impact receiving portion 214 includes a plurality of lugs 226 configured to be impacted (e.g., by a hammer of a rotary impact tool) to rotate the anvil 210 about an axis L. The drive portion 218 includes a drive 232, which in the illustrated embodiment is configured as a square-drive, configured for coupling to a tool bit (e.g., a socket).

In the illustrated embodiment, the anvil 210 has a necked portion 266 located between the drive portion 218 and the shank 222. The illustrated drive 232 has a square cross section, and the illustrated shank 222 is cylindrical. The necked portion 266 is radiused to form a smooth transition between the square drive 232 and the circular shank 222. In other embodiments, the drive 232 and the shank 222 may be differently shaped. The necked portion 266 is configured such that when a tool bit is attached to the drive 232, the tool bit only contacts the drive 232, and the rear end of the tool bit does not contact a shoulder or any other portion of the shank 222. As such, the necked portion 266 may reduce stresses and resulting failures of the anvil 210. In some embodiments, the tool bit may at least partially overlie the necked portion 266 when coupled to the drive 232.

Figure 6:
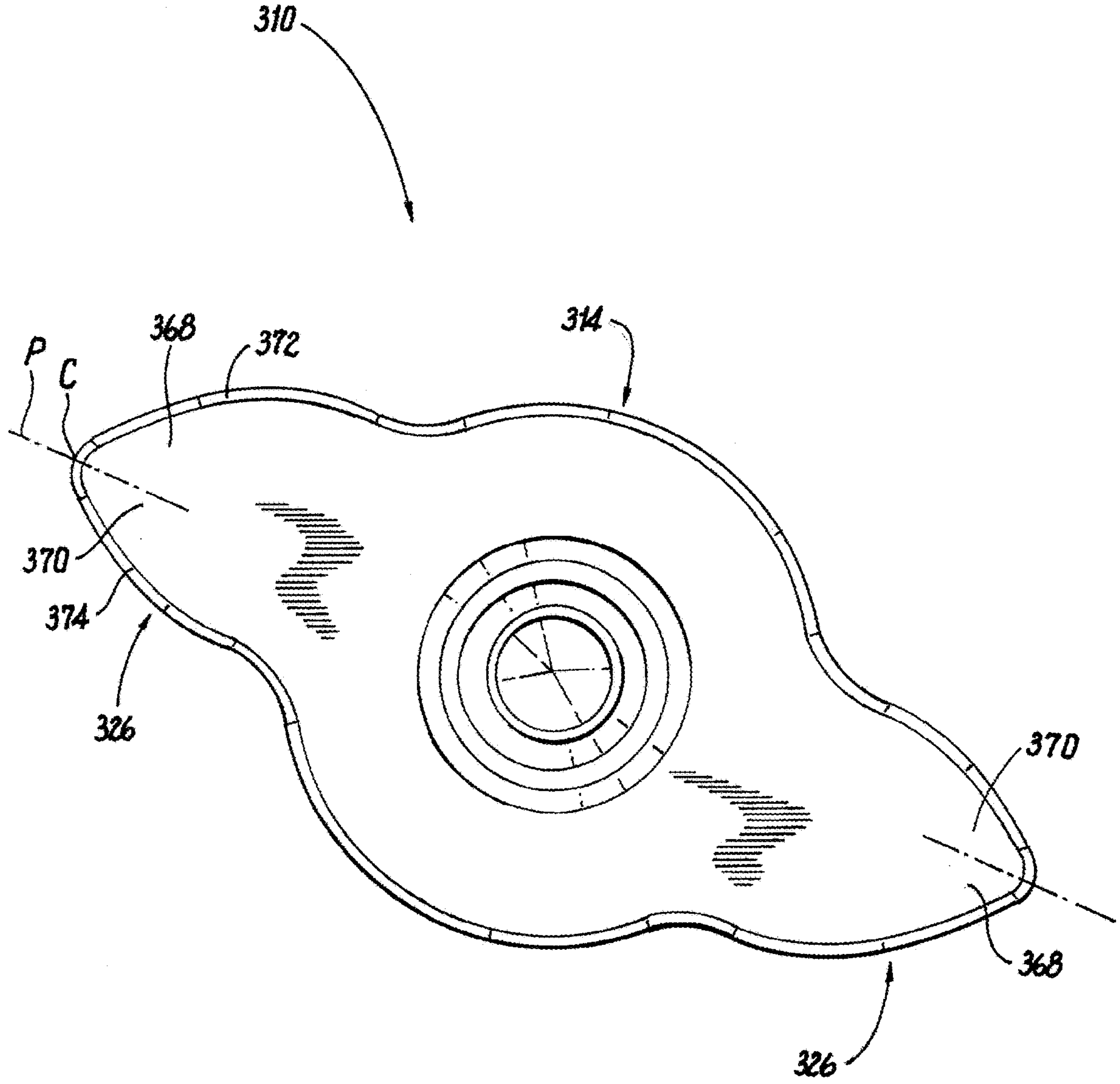
FIG. 6 is a rear end view of an anvil according to another embodiment of the disclosure.

FIG. 6 illustrates an anvil 310 according to another embodiment. The anvil 310 may be similar to the anvils 110 and 210 described above, and features of the anvil 310 may be incorporated into the anvils 110, 210 and vise versa.

The anvil 310 includes an impact receiving portion 314 with lugs 326 that are asymmetric about a central plane P, which divides each of the lugs 326 into a first side 368 and a second side 370. The first side 368 is larger than the second side 370. In other words, a greater portion of the lug 326 is disposed on the first side 368 than the second side 370.

The first side 368 includes a first face 372 and the second side 370 includes a second face 374. The first face 372 is configured to be impacted to rotate the anvil 310 about a central axis in a first direction, and the second face 374 is configured to be impacted to rotate the anvil 310 about the axis in a second direction opposite the first direction. A peak or crest C is located between the first face 372 and the second face 374. The peak C defines a radially outer-most point of each lug 326 relative to the axis. The plane P extends through the peak C of each lug 326.

In the illustrated embodiment, the faces 372, 374 are shaped differently, such that the illustrated anvil lugs 326 have a larger surface area for receiving impacts in the counter-clockwise (loosening) direction than in the clockwise (tightening) direction. This reduces contact stresses on the second faces 374, which may allow the anvil 310 to deliver greater torque in the loosening direction to free a stuck fastener without damaging the lugs 326. For example, the anvil 310 may need to impart 500 ft-lbs in a counter-clockwise direction to loosen and remove a rusted workpiece and only 100 ft-lbs in a clockwise direction to re-secure the workpiece. As such, the asymmetric lugs 326 of the anvil 310 allow the anvil 310 to be better suited to withstand uneven forces.

Figure 7:
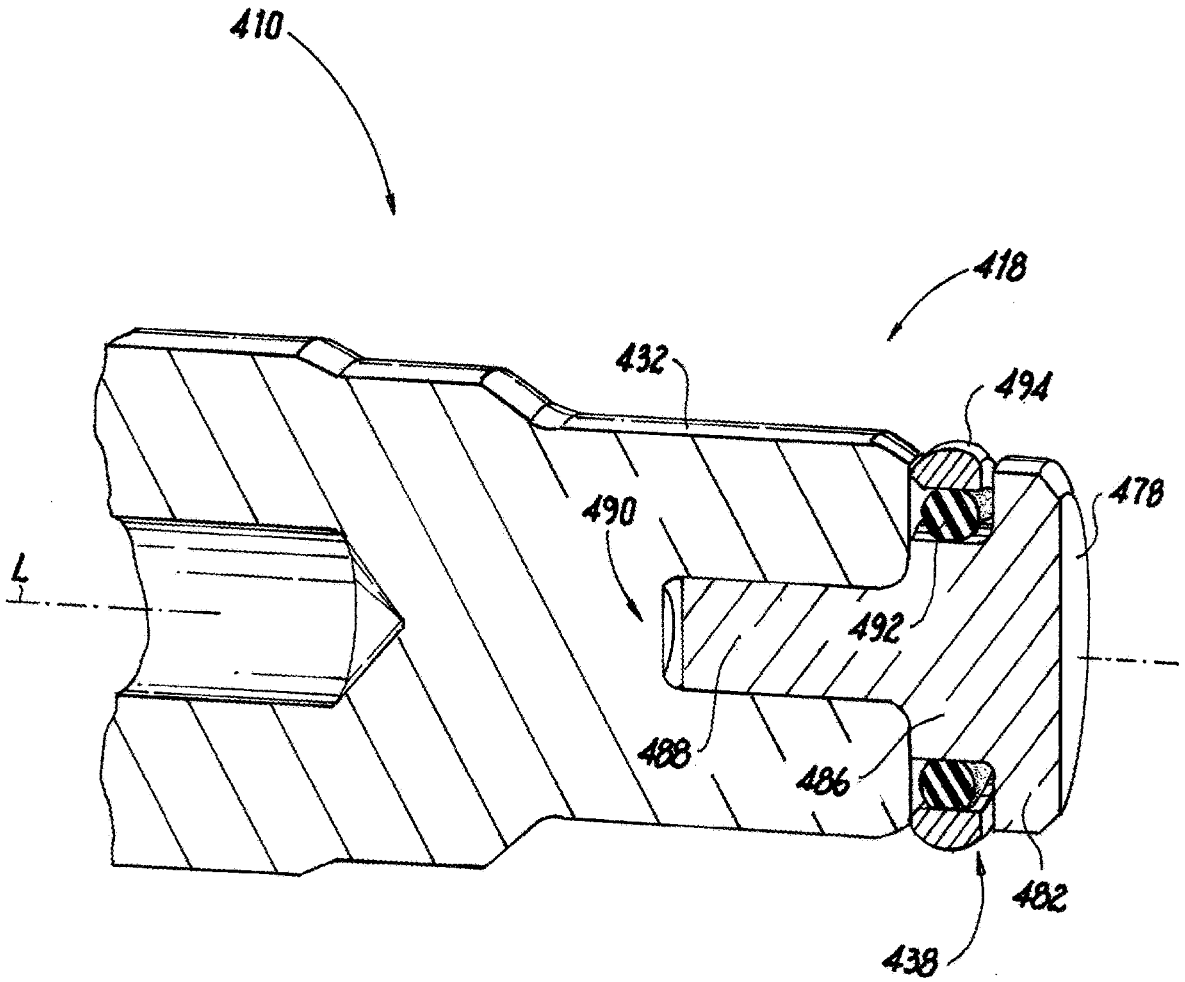
FIG. 7 is a perspective cross-sectional view of a portion of an anvil according to another embodiment of the disclosure.

FIG. 7 illustrates a drive portion 418 of an anvil 410 according to another embodiment. Features of the anvil 410 may be incorporated into the anvils 110, 210, 310 described above, and vice versa. The anvil 410 includes a drive 432 and a removable drive plug 478. The drive plug 478 includes an outer flange 482, an intermediate step 486, and a shaft 488. The shaft 488 is configured to be received in a bore 490 of the drive portion 418 to secure the drive plug 478 to the drive portion 418. The illustrated bore 490 is aligned with the longitudinal axis L. The shaft 488 and/or the bore 490 may include ridges, grooves, a grip portion, or the like to improve how the shaft 488 is secured to the bore 490.

A first ring or inner ring 492 surrounds the step 486 between the outer flange 482 and the drive 432. A second ring or outer ring 494 surrounds the first ring 492. With continued reference to FIG. 7, the inner ring 492 is made of a relatively soft, flexible material (e.g., rubber) and the outer ring 494 is made of a harder, more rigid material (e.g., hard plastic, fiber-reinforced plastic, metal, etc.).

To assemble the anvil 410, the inner ring 492 is secured to the intermediate step 486 of the drive plug 478. Next, the outer ring 494 is secured to the inner ring 492. Finally, the shaft 488 of the drive plug 478 is inserted into the bore 490 to secure the drive plug 478 to the drive portion 418. This assembly is advantageous, as neither the inner ring 492 nor the outer ring 494 need to be stretched over the outer flange 482. Rather, the rings 492, 494 may maintain their original shape throughout the assembly process. This allows the outer ring 494 to be made of harder material. The outer ring 494 is therefore less susceptible to damage and tearing caused by contact with an interior surface of a tool bit.

Figure 8:
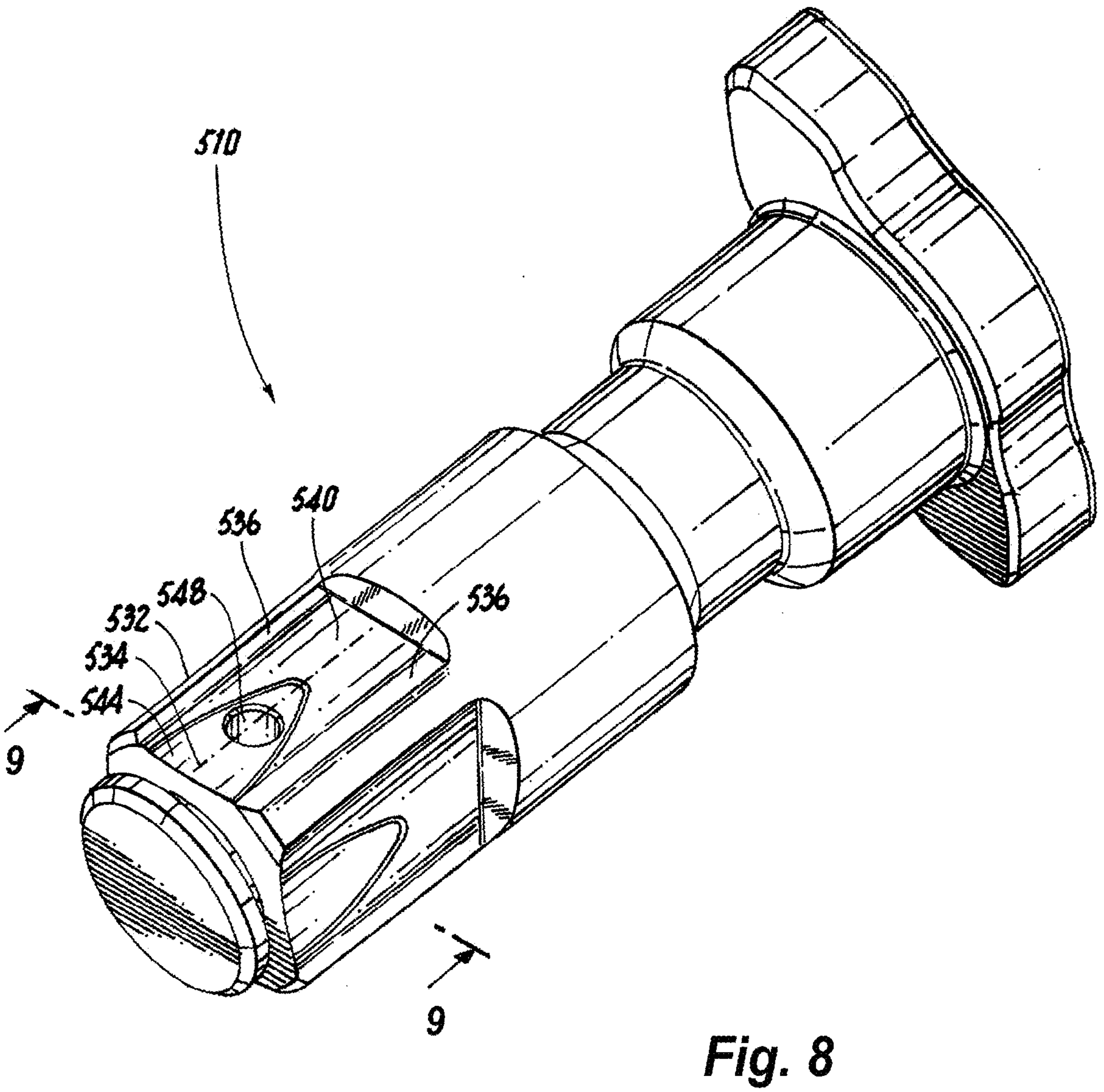
FIG. 8 is a perspective view of an anvil according to another embodiment of the disclosure.
Figure 9:
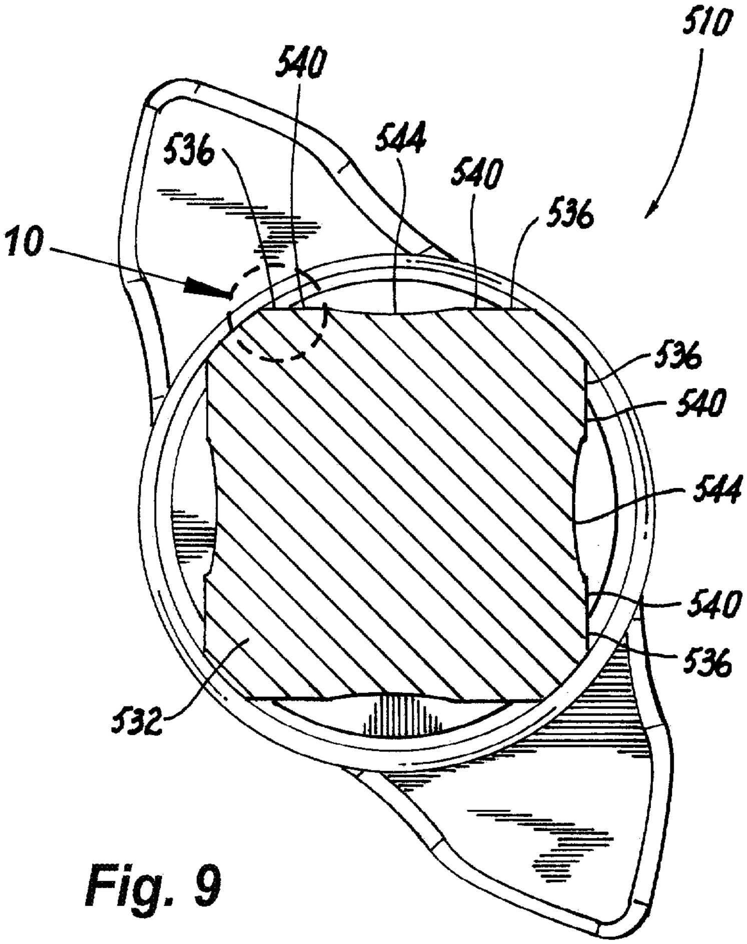
FIG. 9 is a cross-sectional view of the anvil of FIG. 8 taken along line 9-9.

FIGS. 8 and 9 illustrate an anvil 510 according to another embodiment. Features of the anvil 510 may be incorporated into the anvil 110, 210, 310, 410 and vice versa. The anvil 510 includes a drive 532 (also referred to as a drive portion 532). Each side of the drive 532 defines a centerline 534. Each side of the drive 532 has a pair of outer faces 536 and an inner face 540 positioned between the outer faces 536. Each inner face 540 is bisected by the respective centerline 534, and the outer faces 536 are spaced apart from opposite sides of the centerline 534. The illustrated anvil 510 also includes a depression 544 positioned between the outer faces 536 and adjacent the inner face 540. Stated another way, the depression 544 extends into the inner face 540. The depression 544 is bisected by the centerline 534 in the illustrated embodiment.

Figure 10:
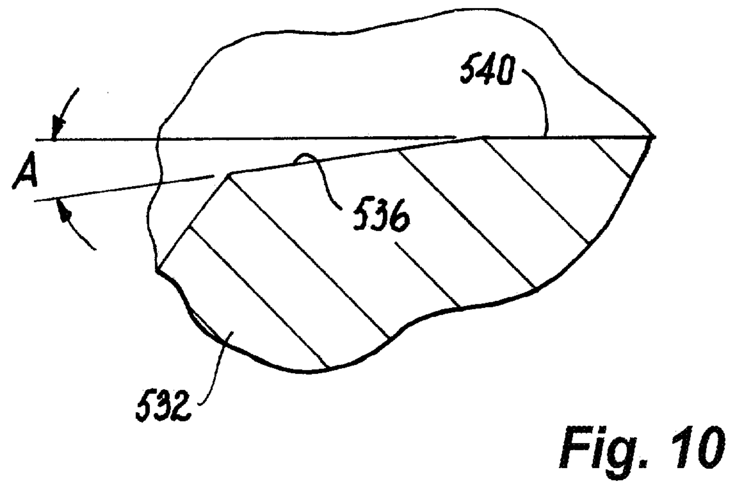
FIG. 10 is an enlarged view of a portion of the anvil of FIG. 9 taken along line 10.

With reference to FIG. 10, the outer faces 536 are angled relative to the inner face 540 by a clearance angle A. Stated another way, each outer face 536 is rotated relative to the inner face 540 in an inward direction. As such, each outermost edge of each outer face 536 is positioned closer to an opposite side of the drive 532 than the adjacent inner face 540. The clearance angle A can be, for example, less than one degree, less than 0.1 degree, etc. In one non-limiting embodiment, the angle A is 0.083 degrees. The clearance angle A promotes planar contact between the drive 532 of the anvil 510 and a socket or a tool bit (not shown), rather than point or line contact.

Planar contact exists when parallel faces contact each other over an area having both length and width. A small amount of clearance typically exists between each side of the drive 532 and corresponding internal faces of the socket due to manufacturing tolerances and to facilitate attachment and detachment of the socket. If the sides of the drive 532 are entirely flat, as in conventional anvils, the clearance may cause the sides of the drive 532 to have non-planar (e.g., line) contact with the corresponding internal faces of the socket. Stated another way, each side of the drive 532 may not be parallel with the corresponding internal face of the socket during contact, since socket may rotate slightly relative to the anvil under load. This non-planar contact increases stresses on the drive 532, which can decrease the lifespan of the anvil 510. The clearance angle A accounts for the clearance between each side of the drive 532 and the corresponding internal face of the socket. As such, the clearance angle A allows for parallel contact between the outer faces 536 and the corresponding internal face of the socket. In the illustrated embodiment, the outer and inner faces 536, 540 are flat, planar surfaces. In other embodiments, the outer faces 536 and/or the inner faces 540 can be arcuate. It should be appreciated that the angle A is illustrated in FIG. 10 as being larger than in FIG. 9. This is done for illustrative purposes.

With returned reference to FIGS. 8 and 9, each depression 544 is recessed into the corresponding side of the drive 532. As such, the outer and inner faces 536, 540 are positioned outward of the corresponding depression 544. Stated another way, each depression 544 is positioned closer to an opposite side of the drive 532 than the adjacent outer and inner faces 536, 540. When the socket is attached to the drive 532, each depression 544 is spaced apart from the corresponding internal face of the socket. As such, the depressions 544 improve the likelihood that planar contact is made between the outer faces 536 and the corresponding internal faces of the socket. Stated another way, as the drive 532 rotates, the depressions 544 inhibit the central portion of each side of the drive 532 from contacting the corresponding internal face of the socket. In the illustrated embodiment, each depression 544 has an arcuate shape. More specifically, each depression 544 has a semielliptical shape. In other embodiments, each depression 544 can have a different shape (e.g., triangular, semicircular, etc.). In the illustrated embodiment, the depression 544 has a variable depth. The depth of the depression 544 is greatest at the centerline 534, and the depth decreases further from the centerline 534. In the illustrated embodiment, each depression 544 extends along approximately half of the corresponding side of the drive 532, measured along the rotational axis L (shown in FIG. 3). In other embodiments, each depression 544 can extend any suitable distance along the corresponding side of the drive 532. In the illustrated embodiment, each side of the drive 532 includes one depression 544. In other embodiments, the drive 532 can include depressions 544 on a fewer number of sides (e.g., three sides, two opposite sides, etc.). In the illustrated embodiment, a bore 548 extends through the depression 544. The bore 548 can extend through two opposite sides of the drive 532. The bore 548 can, for example, receive a pin (not shown). The pin can improve a connection between the drive 532 and the socket.

Figure 11:
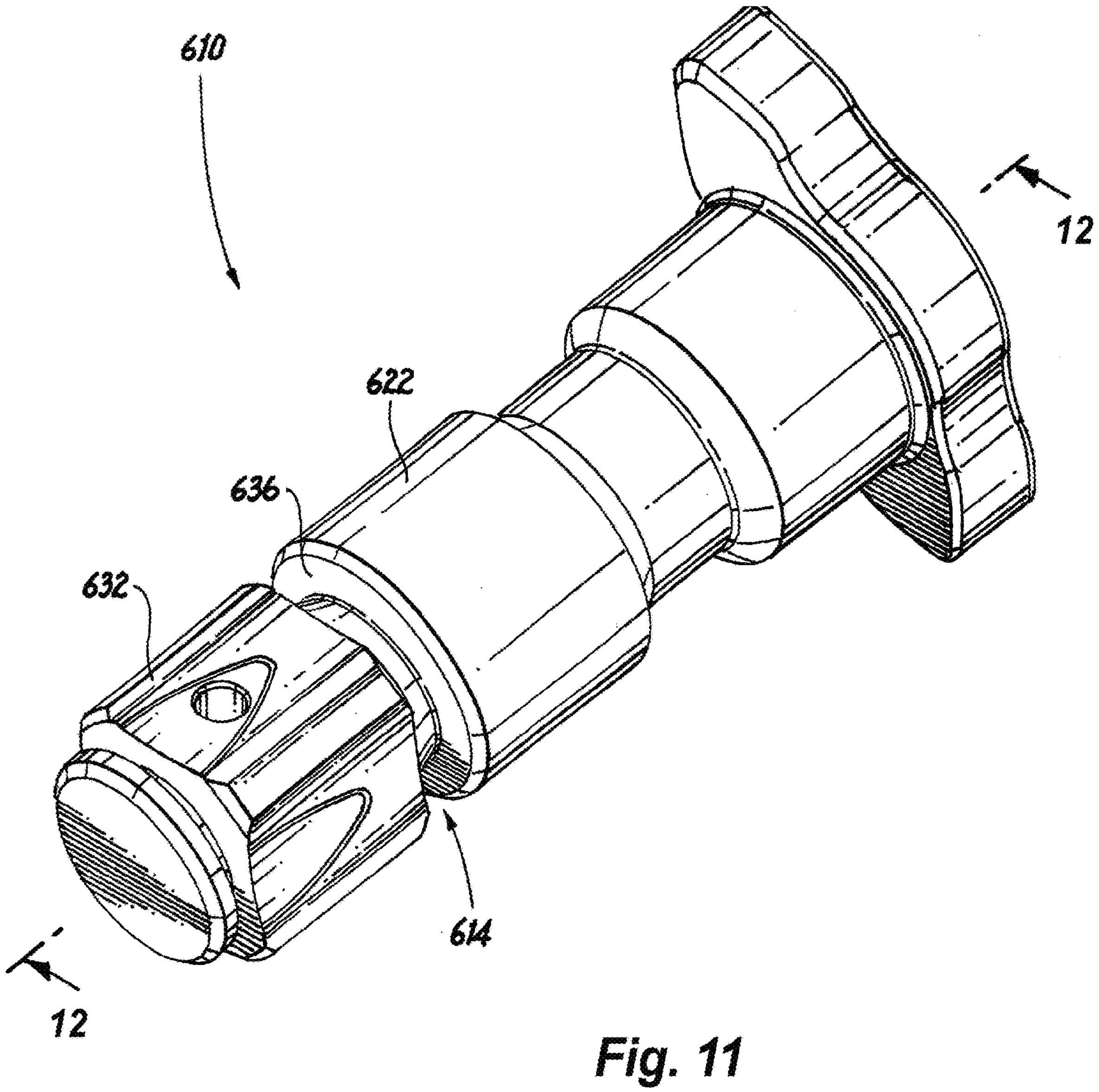
FIG. 11 is a perspective view of an anvil according to another embodiment of the disclosure.
Figure 12:
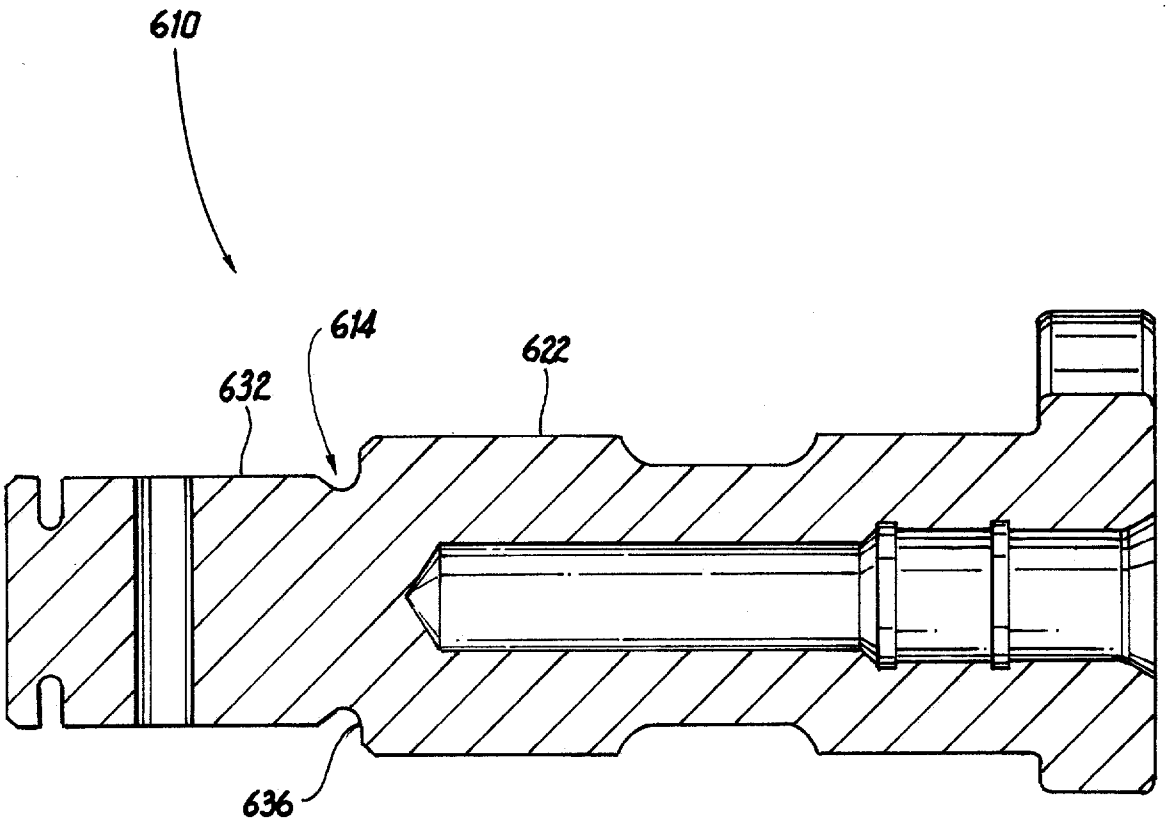
FIG. 12 is a cross-sectional view of the anvil of FIG. 11 taken along line 12-12.

FIGS. 11 and 12 illustrate an anvil 610 according to another embodiment. Features of the anvil 610 may be incorporated into the anvil 110, 210, 310, 410, 510 and vice versa. The anvil 610 includes an annular channel 614 (also referred to as a necked portion 614) positioned between a shank 622 and a drive 632 (also referred to as a drive portion 632). The annular channel 614 includes a flat shoulder 636 on a side of the channel 614 adjacent the shank 622. The flat shoulder 636 is oriented perpendicular to the rotational axis L (shown in FIG. 3) of the anvil 610. In addition, the flat shoulder 636 is oriented perpendicular to outer surface of the shank 622 and the outer surface of the drive 632. The flat shoulder 636 allows for planar contact between the anvil 610 and the socket (not shown) coupled to the anvil 610. The socket extends over the channel 614 and into contact with the flat shoulder 636. The connection between the socket and the anvil 610 is improved by the socket contacting the flat shoulder 636 relative to, for example, an angled shoulder.

Thus, the present disclosure provides, among other things, an impact tool anvil with geometric features that may reduce stresses on the anvil during operation and thereby improve the durability and service life of the anvil. Representative features are set out in the following clauses, which stand alone or may be combined, in any combination, with one or more features disclosed in the text and/or drawings of the specification.

Clause 1. An anvil for use with an impact tool, the anvil comprising: an impact receiving portion having a lug configured to be impacted to rotate the anvil about an axis; a drive portion opposite the impact receiving portion, the drive portion configured for coupling to a tool bit; and a shank extending between the impact receiving portion and the drive portion, wherein the shank includes a necked portion having a reduced diameter, the necked portion located adjacent the drive portion and between the impact receiving portion and the drive portion.

Clause 2. The anvil of clause 1, wherein the necked portion includes a flat shoulder on a side of the necked portion opposite the drive portion.

Clause 3. The anvil of clause 2, wherein the flat shoulder is oriented perpendicular to an outer surface of the shank.

Clause 4. The anvil of clause 2, wherein a tool bit is configured to couple to the drive portion, and wherein the tool bit is configured to contact the flat shoulder.

Clause 5. The anvil of clause 1, wherein the necked portion is a first necked portion, and wherein the shank includes a second necked portion positioned between the first necked portion and the impact receiving portion, the second necked portion having a reduced diameter.

Clause 6. An anvil for use with an impact tool, the anvil comprising: an impact receiving portion having a lug configured to be impacted to rotate the anvil about an axis; a drive portion opposite the impact receiving portion, the drive portion including a side having a first portion and a second portion angled relative to the first portion, the drive portion configured for coupling to a tool bit; and a shank extending between the impact receiving portion and the drive portion.

Clause 7. The anvil of clause 6, wherein first portion is positioned on an inner portion of the side and the second portion is positioned on an outer portion of the side.

Clause 8. The anvil of clause 6, wherein the side of the drive portion includes a third portion angled relative to the first portion, and wherein the first portion is positioned between the second and third portions.

Clause 9. The anvil of clause 8, wherein the second portion is angled relative to the first portion by a first angle, and wherein the third portion is angled relative to the first portion by the first angle.

Clause 10. The anvil of clause 6, wherein the second portion is angled 0.083 degrees relative to the first portion.

Clause 11. The anvil of clause 6, wherein the shank includes a necked portion having a reduced diameter, the necked portion located adjacent the drive portion and between the impact receiving portion and the drive portion.

Clause 12. The anvil of clause 6, wherein the drive portion is configured for coupling to a tool bit, and wherein the second portion is configured to contact an inner surface of the tool bit.

Clause 13. The anvil of clause 12, wherein the second portion is configured to have planar contact with the inner surface of the tool bit.

Clause 14. The anvil of clause 6, wherein the side of the drive portion includes a depression extending into the first portion.

Clause 15. An anvil for use with an impact tool, the anvil comprising: an impact receiving portion having a lug configured to be impacted to rotate the anvil about an axis; a drive portion opposite the impact receiving portion, the drive portion including a side having a depression, the drive portion configured for coupling to a tool bit, the depression configured to be spaced apart from the tool bit; and a shank extending between the impact receiving portion and the drive portion.

Clause 16. The anvil of clause 15, wherein a bore extends through the depression.

Clause 17. The anvil of clause 15, wherein the side includes a first portion and a second portion angled relative to the first portion, and wherein the depression extends into the first portion.

Clause 18. The anvil of clause 15, wherein the depression has an arcuate shape.

Clause 19. The anvil of clause 15, wherein the depression has a variable depth.

Clause 20. The anvil of clause 15, wherein the drive portion is configured for coupling to a tool bit, and wherein the depression is configured to be spaced apart from an inner surface of the tool bit.

Clause 21. An anvil for use with an impact tool, the anvil comprising: an impact receiving portion having a lug configured to be impacted to rotate the anvil about an axis; a drive portion opposite the impact receiving portion, the drive portion configured for coupling to a tool bit; a shank extending between the impact receiving portion and the drive portion; and a target extending outwardly from the shank between the impact receiving portion and the drive portion, wherein the shank includes a necked portion having a reduced diameter, the necked portion located between the lug and the target.

Clause 22. The anvil of clause 21, wherein the necked portion is a first necked portion, and wherein the shank further includes a second necked portion located between the target and the drive portion.

Clause 23. The anvil of clause 21, wherein the shank and the target are integrally formed together as a single piece.

Clause 24. An anvil for use with an impact tool, the anvil comprising: an impact receiving portion including first and second lugs, each of the first and second lugs having a first face configured to be impacted to rotate the anvil about an axis in a first direction, a second face configured to be impacted to rotate the anvil about the axis in a second direction opposite the first direction, and a peak located between the first face and the second face, the peak defining a radially outer-most point of each first and second lug relative to the axis; and a drive portion opposite the impact receiving portion, the drive portion configured for coupling to a tool bit, wherein a plane is defined through the peak of the first lug and the peak of the second lug such that the plane extends between the first impact face and the second impact face of each of the first and second lugs; and wherein each of the first and second lugs is asymmetric about the plane.

Clause 25. An anvil for use with an impact tool, the anvil comprising: an impact receiving portion having a lug configured to be impacted to rotate the anvil about an axis; a drive portion opposite the impact receiving portion, the drive portion configured for coupling to a tool bit, the drive portion including a bore extending into the drive portion along the axis; a shank extending between the impact receiving portion and the drive portion; and a plug having an annular flange, a shaft, and a step between the annular flange and the shaft, the shaft being receivable in the bore; a first ring surrounding the step, the first ring made of a first material; and a second ring surrounding the first ring, the second ring made of a second material with a greater hardness than the first material.

Various features and aspects of the disclosure are set forth in the following claims.

What is claimed is:

1. An anvil for use with an impact tool, the anvil comprising:
- an impact receiving portion having a lug configured to be impacted to rotate the anvil about an axis;
- a drive portion opposite the impact receiving portion, the drive portion configured for coupling to a tool bit; and
- a shank extending between the impact receiving portion and the drive portion,
- wherein the shank includes a necked portion having a reduced diameter, the necked portion located adjacent the drive portion and between the impact receiving portion and the drive portion,
- wherein the necked portion includes a shoulder on a side of the necked portion opposite the drive portion,
- wherein a tool bit is configured to couple to the drive portion, and
- wherein the tool bit is configured to contact the shoulder.

2. The anvil of claim 1, wherein the shoulder is flat.

3. The anvil of claim 2, wherein the flat shoulder is oriented perpendicular to an outer surface of the shank.

4. The anvil of claim 1, wherein the necked portion is a first necked portion, and wherein the shank includes a second necked portion positioned between the first necked portion and the impact receiving portion, the second necked portion having a reduced diameter.

5. An anvil for use with an impact tool, the anvil comprising:
- an impact receiving portion having a lug configured to be impacted to rotate the anvil about an axis;
- a drive portion opposite the impact receiving portion, the drive portion including
  - a first side having a first portion and a second portion angled relative to the first portion,
  - a second side adjacent the first side, and
  - a beveled surface between the first side and the second side, the drive portion configured for coupling to a tool bit; and
- a shank extending between the impact receiving portion and the drive portion,
- wherein the second portion of the first side is positioned between the first portion of the first side and the beveled surface.

6. The anvil of claim 5, wherein first portion is positioned on an inner portion of the first side and the second portion is positioned on an outer portion of the first side.

7. The anvil of claim 5, wherein the first side of the drive portion includes a third portion angled relative to the first portion, and wherein the first portion is positioned between the second and third portions.

8. The anvil of claim 7, wherein the second portion is angled relative to the first portion by a first angle, and wherein the third portion is angled relative to the first portion by the first angle.

9. The anvil of claim 5, wherein the second portion is angled 0.083 degrees relative to the first portion.

10. The anvil of claim 5, wherein the shank includes a necked portion having a reduced diameter, the necked portion located adjacent the drive portion and between the impact receiving portion and the drive portion.

11. The anvil of claim 5, wherein the drive portion is configured for coupling to a tool bit, and wherein the second portion is configured to contact an inner surface of the tool bit.

12. The anvil of claim 11, wherein the second portion is configured to have planar contact with the inner surface of the tool bit.

13. The anvil of claim 5, wherein the first side of the drive portion includes a depression extending into the first portion.

14. An anvil for use with an impact tool, the anvil comprising:

an impact receiving portion having a lug configured to be impacted to rotate the anvil about an axis;

a drive portion opposite the impact receiving portion, the drive portion including a side having a depression, the depression extending through an end of the side opposite the impact receiving portion, the drive portion configured for coupling to a tool bit, the depression configured to be spaced apart from the tool bit; and a shank extending between the impact receiving portion and the drive portion.

15. The anvil of claim 14, wherein a bore extends through the depression.

16. The anvil of claim 14, wherein the side includes a first portion and a second portion angled relative to the first portion, and wherein the depression extends into the first portion.

17. The anvil of claim 14, wherein the depression has an arcuate shape.

18. The anvil of claim 14, wherein the depression has a variable depth.

19. The anvil of claim 14, wherein the drive portion is configured for coupling to a tool bit, and wherein the depression is configured to be spaced apart from an inner surface of the tool bit.

* * * * *